April 15, 1969   S. CHERNEY ET AL   3,438,812
RECHARGEABLE ALKALINE CELL
Filed Aug. 25, 1965
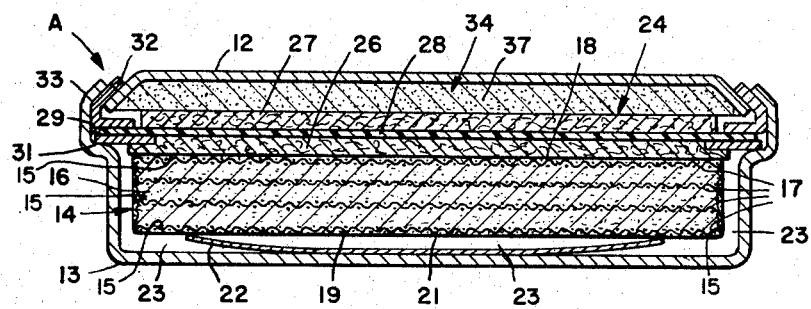
FIG_1
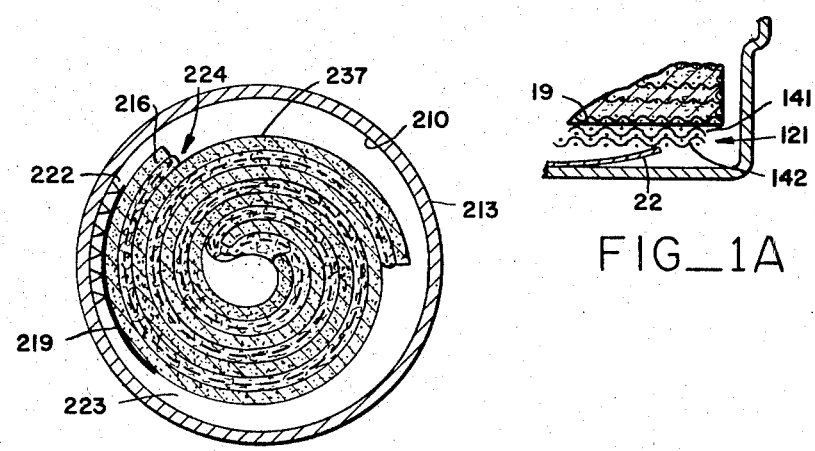
FIG_2
FIG_1A
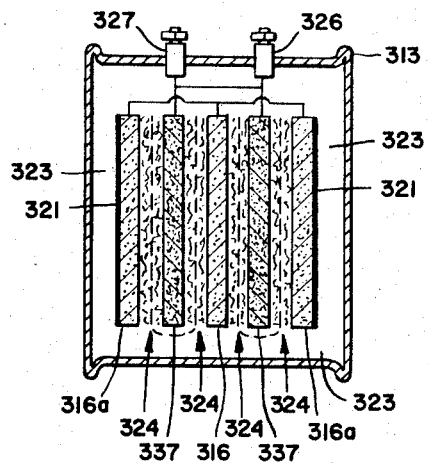
FIG_3
INVENTOR.
SEYMOUR CHERNEY
MARTIN G. KLEIN
MORRIS EISENBERG
ATTORNEYS 3,438,812
RECHARGEABLE ALKALINE CELL
Seymour Cherney, Berkeley, Martin G. Klein, Glendora, and Morris Eisenberg, Palo Alto, Calif., assignors to Electrochimica Corporation, Menlo Park, Calif.
Filed Aug. 25, 1965, Ser. No. 482,488
Int. Cl. H01m 1/08, 35/04, 43/04
U.S. Cl. 136—6                                   15 Claims

ABSTRACT OF THE DISCLOSURE

In a rechargeable alkaline electrochemical cell having an enclosure, a cathode mounted within the enclosure, and a wet separator impregnated with an alkaline electrolyte solution and having one surface in liquid contact with the cathode of the cell, a porous anode mounted within the enclosure with one surface thereof in liquid contact with the separator surface remote from the cathode, an oxygen recombination catalytic material disposed on the surface of the anode remote from the separator, with the entire cell so constructed that there is an open passageway for free fluid circulation from the wet separator to the oxygen recombination catalytic material disposed on the surface of the anode, whereby oxygen gas produced during the charge and overcharge period of the charge-discharge cycle of the cell causes oxygen to come into contact with the oxygen recombination catalytic material on the anode, thereupon to be reduced to hydroxyl ions thus reducing the risk of excessive gas pressure building up in the cell during the charge and over-charge portion of the cell cycle while also maintaining a favorable alkalinity condition within the cell itself.

---

This invention relates to electrochemical batteries of the rechargeable alkaline cell type and more particularly to the recombination of oxygen gas produced by such cells during charge and overcharge periods of the charge-discharge cycle.

In rechargeable alkaline cell batteries, when the charge step approaches completion, evolution of oxygen normally occurs as a result of the parallel half-cell reaction, $$2OH^- - 2E^- \rightarrow H_2O + \tfrac{1}{2} O_2$$

As the positive (cathode) plates in the battery become fully charged, the above reaction becomes responsible for a considerable production of oxygen gas; simultaneous evolution of hydrogen gas at the negative (anode) plates may be avoided by an overdesign in the capacity of those plates. This leaves the production of oxygen in the latter stages of charge and overcharge as a major problem since such production consumes hydroxyl ions thereby upsetting the electrolyte composition, including pH, and the electrochemical behavior of the battery cell or cells.

Some recombination of oxygen to form hydroxyl ion and a reduction in the amount of free oxygen present, may occur on the anode surface of a cell during the aforementioned charge and overcharge portion of the cell cycle. The overall reaction for such recombination, for example with a bivalent anode, may be written as follows:

$$O_2 + 2H_2O + 2A \rightarrow 2A(OH)_2$$

where A may be a material such as cadmium, zinc or the like. The rate at which this recombination occurs, however, generally is insufficient to overcome the problem of oxygen generation particularly where a high rate of charging is involved in the use of the batteries.

It is of some importance that the aforementioned oxygen recombination may be made to occur more rapidly in cells employing a cadmium anode and a silver oxide cathode than, for example, in a cadmium-nickel oxide cell. At the same time, however, oxygen production may also be made more rapid in a cadmium-silver oxide than in a cadmium-nickel oxide cell due to the higher rate capability of the former. Thus in the cadmium-silver oxide cell the problem of oxygen production is generally more pronounced than in the cadmium-nickel oxide case. It is also recognized in the art that the cadmium-silver oxide cell is a preferred combination in many applications due to the very fact that such cells discharge and charge at a higher rate. Hence a solution to the problem of oxygen production by way of recombination is of particular interest and of substantial value for cells of the cadmium-silver oxide type.

Another problem which accompanies that of oxygen evolution is loss of some electrolyte through entrainment with the evolving gas. This may result in the additional deleterious effect of drying up the cell. Sealing of such an unbalanced cell is obviously dangerous since it could lead to early failure by bursting. Thus, in applications which call for a sealed cell, such a system may not be employed.

A solution to the above problem of oxygen production in a rechargeable alkaline cell battery has long been sought. In this connection it should be noted that recombination of oxygen gas to form hydroxyl ion, and thus the reduction in the amount of oxygen gas present, is a two-step process going through the peroxide stage, a phenomenon now well recognized in the art and set forth in somewhat greater detail hereinafter. Since decomposition of peroxide ion, $HO_2^-$, is involved, the decomposition reaction must be rapid in order to accomplish the desired step of oxygen recombination as a practicable rate.

Various prior art devices with which we are familiar to achieve the above mentioned peroxide ion decomposition, and hence oxygen recombination, generally utilize some form of a separate plate or electrode element, in some cases called a third or auxiliary electrode, normally partially immersed in a liquid electrolyte solution and connected directly, or through diodes or other suitable circuitry, to the appropriate working electrodes. These devices, even with catalytic materials added, achieve a relatively limited rate of oxygen recombination; and, furthermore, generally impose undesirable demands on the geometry of battery design, weight and cost as well as requiring at least partial immersion of the electrodes in a free liquid electrolyte and either additional external and internal circuitry, or both.

After much experimentation we discovered that the decomposition of the peroxide ion, and hence recombination of oxygen, may be achieved and substantially accelerated in an alkaline cell having an immobilized electrolyte by the novel expedient of using a thin catalytic deposition directly on the surface of a specially constructed porous anode away from the cathode and main flow of electrical current. A complete analysis of the acceleration of the peroxide ion decomposition which occurs at our novel catalytic layer-anode combination is beyond the scope of this patent. The results achieved, however, show a surprising improvement over reported results of cells utilizing a separate or auxiliary electrode having substantially the same catalyst and employed in cells utilizing the same half cell reactions; and the comparison includes those cells using an auxiliary electrode directly in contact with the anode but where the anode is of a substantially impervious construction and the entire anodic assembly requires direct partial immersion in an aqueous electrolyte solution.

Thus it is an object of the present invention to provide a rechargeable alkaline cell having a novel porous anode including a thin catalytic layer comprising an evenly distributed particulate catalyst applied directly to the anode on its surface opposite the cathode. Such a catalytic layer provides for the rapid recombination of oxygen gas produced during the charge and overcharge portion of the charge-discharge cycle of the cell.

It is also an object of this invention to provide a cell having the aforementioned novel anodic catalytic layer and wherein the electrolyte is contained within absorbent separators between electrodes; and there is formed a passageway to permit contact of oxygen gas with the catalytic layer where recombination of the oxygen may take place.

A feature and advantage of the above described novel cell construction including the anodic catalytic layer is that the recombination of oxygen which is catalyzed thereby proceeds at a relatively greater rate than would be the case if the same or similar catalyst were applied to a separate electrode, or one in contact with a conventional anode, in a cell employing the same half cell reactions. More specifically this feature and advantage is most pronounced in cells such as those employing a porous anode containing a cadmium and a silver oxide cathode where there is a high rate of oxygen production and oxygen recombination is particularly necessary and desirable.

Another feature and advantage of this invention is that the catalytic layer may be formed with relatively little or no additional structure to the cell and without an aqueous liquid electrolyte and additional internal or external electrical circuitry. In this way an extremely compact rechargeable alkaline cell system may be fabricated having a relatively reduced size and weight and requiring little if any modification in cell configuration or plate design. Moreover, since the electrolyte is not in a free liquid form, the cell may be oriented in any direction. This is of particular importance in cell applications where employment of a separate recombination element is prohibited by geometric and other restrictions; and it is desirable that the cell be capable of operation in various directional orientations, e.g., upright, on a side, etc.

It is a further object of this invention to provide a novel rechargeable alkaline cell having a thin catalytic layer applied to a pellet shaped anode within a button shaped housing. The cell housing is fabricated of two portions which form the anode and cathode terminals having a gastight, electrically insulative seal therebetween. A spring is provided to urge the pellet shaped anode away from one inside surface of the cell housing to form a passageway to permit any generated oxygen to come into contact with the catalytic layer where recombination of oxygen to hydroxyl ions and a reduction in the amount of free oxygen present may occur.

A feature and advantage of the above novel button cell is that such a cell configuration may be made relatively more compact than similar cells employing prior art devices for the recombination of oxygen gas with which we are familiar. Since such button cells have a wide variety of applications due to their compact size and convenient shape, achieving a proper oxygen recombination therein has been a long-sought objective in the art.

A more specific object of this invention is to provide the above mentioned catalytic layer comprising an evenly distributed particulate catalyst having at least one component selected from the group consisting of the platinum metals and silver, and a carrier material for the catalyst containing at least one component selected from the group consisting of nickel, carbon, graphite, or silver.

A further object of this invention is to provide an oxygen atmosphere in the passageway formed in the above described novel cell structure.

The advantage of the last mentioned object is that the rate of oxygen recombination is generally increased in an atmosphere of oxygen gas.

Other objects, features and advantages will become apparent by reading the following specification and referring to the accompanying drawing wherein the same characters of reference correspond to the same components.

Turning now to the drawings

FIG. 1 is sectional elevation of a so-called button type cell embodying our invention;

FIG. 1A is a partial sectional elevation of a button cell showing an alternate of one portion thereof embodying our invention;

FIG. 2 is a sectional view of another type cell embodying our invention;

FIG. 3 is a sectional elevation of a prismatic type cell embodying the invention herein.

The invention is best understood by referring first to FIG. 1 wherein a button cell is indicated generally at A and includes metallic cover 12; can body 13, which may be of any suitable metallic material, for example a nickel or silver plated material, or solid nickel or silver; a porous anode indicated at 14 containing a metal such a cadmium, a separator at 24 including an entrained or immobilized electrolyte such as an aqueous solution of an alkali metal hydroxide; and a cathode generally indicated at 34 containing a material such as silver oxide. In addition to providing an enclosure for the various cell components the upper cover may act as the positive or cathode electrode terminal while can 13 may perform the function of the negative or anode electrode terminal.

The pellet-shaped anode indicated at 14 is of a novel composite construction and in the particular embodiment indicated here internal portion 16 may be made by employing a mix that, in its final form, is predominantly cadmium with some nickel powder and a small amount of carboxymethylcellulose as a relatively inert binder. It is an important feature of our novel anode construction, for reasons that will become apparent hereinafter, that the anode be of a porous nature after complete formation, e.g., in the neighborhood of the range of 30% to 70% of void space per unit volume of anode.

We have discovered a novel and satisfactory configuration for the aforementioned anode by forming the aforementioned mixture into pellet having a system of suitable electron conductive grids such as screens or expanded metals 17 placed both within the anode body portion 16, along outer surface 18, and around pellet periphery 15 to provide good electrical contact to all points of the external surface of the anode which conduct current as well as to the interior thereof. With the aid of conductive nickel powder added to the anode mix, good electronic conduction is provided to nearly all of the cadmium particles. This is of considerable importance since the cadmium metal in the anode is oxidized to cadmium oxide during discharge of the cell, and the oxide alone would afford poor conductive characteristics during the recharging of the cell. Also, we have found it satisfactory to form the screens into the surface of the anode along, creating a basket type arrangement of outer screens 17 only.

Surface 19 of the anode indicated at 14 and facing away from the cathode indicated at 34 is provided with a catalytic layer indicated more or less schematically by heavy line 21. In the exemplary embodiment here shown the catalytic layer is made up of finely distributed platinum particles adhered on the surface of larger particles of nickel powder; the preparation of such a powdered mixture is a known expedient in the electrochemical art and hence is not described in detail in respect to its use here. The catalytic layer may be adhered to surface 19 by means of a relatively inert paste or other suitable adhering techniques known to those skilled in the battery art.

The anode pellet indicated at 14 is positioned within can 13 by means of arched spring 22 which may be selected of any suitable spring material. In the embodiment shown in FIG. 1 the spring is also a conductor providing the necessary electronic path between the anode and the metallic can body which also acts as the anode terminal. One example of such a spring that we have found satisfactory is a stainless steel material yielding a pressure of 8 pounds per square inch by anode surface 18 at the interface with the electrolyte separator 24. The positioning of the anode by means of spring 22 within can body 13 provides free space 23 around the entire anode, with the exception of surface 18, and in particular provides a passageway for oxygen produced within the cell to come into contact with catalytic layer 21. In addition the action of the spring maintains a relatively fixed and minimized interval between the adjacent, facing surfaces of the anode and cathode. In this way the internal ohmic resistance due to such interval is minimized and kept constant.

The anode indicated at 14 is separated from the cathode 34 by means of a separator indicated at 24 comprising electrolyte bearing layers 26 and 27, which may be of a suitable non-woven, low density material such as cotton or nylon entraining an alkaline electrolyte such as an aqueous solution of an alkali metal hydroxide; and separator barrier 28 which may be made of cellophane, regenerated cellulose, or cross-linked polyethylene. The electrolyte bearing layers 26 and 27 hold a sufficient amount of alkaline electroyte to maintain wetting of the active electrodes in the cell, and barrier 28 therebetween, for proper conductivity without permitting electrolyte solution to flood passageway 23 thereby preventing contact of oxygen gas produced within the cell and catalytic layer 21. In addition barrier 28 prevents cross migration of electrode material, in this case silver, towards the anode which could lead to early shorting and failure of the cell.

In button cells as exemplified by the type shown in FIG. 1, we have found that migration of cathode material, such as silver toward the cadmium anode, may occur not only between the central portions of the cathode and anode but also in the vicinity of the inner peripheral surface 29 of can body 13 in the annular region surrounding the interface of barrier 28 and anode electrolyte layer 26. To prevent such peripheral cathodic migration we provide annular seal 31 about the periphery of the barrier layer 28, a portion of the entire separator layer indicated at 24. Annular seal or washer 31 may be fabricated of rubber, plastic or other suitable non-pourous material. A V-shaped annular cover seal 32, formed of rubber or other suitable insulative material, is disposed as shown in FIG. 1 directly between crimping edge 33 of can body 13 and cathode bearing cover 12 which may be dish-shaped or formed in other suitable configurations, e.g., concentric corrugations or the like. This seal provides a gastight, electrically insulative separation between the cover and body, which also serve as electrode terminals.

The cathode indicated generally at 34 comprises cup-shaped cathode cover 12 which contains silver oxide layer 37 suitably secured therein by means known to those skilled in the art and not further described herein. The cover is held in position on the top of the previously assembled cell components within can body 13 with seal 32 in place by means of flange 33 which may be crimped or otherwise secured to form the final configuration of the cell as shown in the section of FIG. 1.

Immediately prior to final placement of the separator assembly indicated at 24, and before placing the cathode cover in position and crimping the cell shut, the air present in passageway 23 may be replaced with oxygen gas in order to facilitate oxygen recombination during charge and overcharge of the cell itself.

After the cell is assembled and in use through the discharge portion of its cycle, the cadmium in the anode is oxidized to cadmium oxide and the silver oxide of the cathode is reduced to silver. Before further discharge, the cell must be recharged, i.e., the cadmium oxide at the anode must be converted back to cadmium metal and the silver at the cathode to silver oxide. During such charge and overcharge, as explained in the earlier part of this specification considerable production of oxygen normally occurs at the cathode. The oxygen gas thus produced diffuses through the separator layers 26, 27 and barrier 28 to circulate into passageway 23 or increase the oxygen pressure within the passageway if such gas already occupies the cell as above described. As the oxygen is produced and contacts catalytic layer 21, a two-step process occurs which converts the oxygen to hydroxyl ion. The first step may be expressed by the reaction

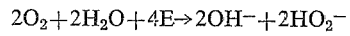

$$2O_2 + 2H_2O + 4E \rightarrow 2OH^- + 2HO_2^-$$

The second step which occurs, and is much accelerated by our novel anodic catalytic layer, may be expressed by the equation

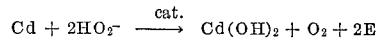

$$Cd + 2HO_2^- \xrightarrow{cat.} Cd(OH)_2 + O_2 + 2E$$

The oxygen present in the environment in which the above reactions are simultaneously and continuously occurring can be seen to be continually reduced as represented by the two oxygen molecules in the above first reaction being eventually converted to one oxygen molecule in the second reaction. Thus during the charge and overcharge portion of the charge-discharge cycle of the alkaline cell, in the case shown here a silver oxide-cadmium alkaline cell, our novel anodic catalytic layer achieves rapid removal of the peroxide ion $HO_2^-$ and hence the consumptive reaction for oxygen which proceeds at a relatively high and efficient rate.

Our novel porous anode and structurally integrated catalytic layer combination, which faces away from the cathode, achieves the aforementioned oxygen recombination at a relatively maximum rate compared to prior art devices with which we are familiar. This may be at least partly explained by the fact that some electrolyte passes through the pores of our anode and forms a thin film of electrolyte at the interface with the catalytic layer which is structurally integrated with the anode. The thin film of electrolyte thus formed is about equal in thickness to what would be the thickness of the intrinsic meniscus of such a solution on the anode if the latter were immersed in a free liquid electrolyte solution; however, the thin layer formed by our novel porous anode-catalytic layer is spread over the entire area of the catalytic layer interface, not just at the limited periphery or intrinsic meniscus as would be the case in an electrode dipped in a free liquid solution. Thus the region of oxygen recombination is maximized in our novel cell design, so that the reaction itself is caused to occur at a relatively maximum rate.

Although our invention has been described above in an embodiment utilizing a silver oxide-cadmium type alkaline cell with a platinum catalyst layer, a number of other anode and cathode combinations and catalysts may be utilized. For example, the initial anodic material may be zinc oxide or the like in combination with nickel powder, or a suitable form of graphite or carbon black, singly or in combination, in amounts ranging from 2% to 45% with an additional suitable organic binder in amounts ranging from $\frac{1}{10}$% to 8%. The catalytic layer, instead of containing platinum as a catalyst, may contain palladium, rhodium, iridium, nickel, and siliver, i.e., the platinum metals and silver, or various mixtures and alloys thereof, as well as certain catalytic oxides such as the well-known cobalt spinels.

In addition the catalytic layer described above in respect to FIG. 1 may also be provided in various alternative arrangements. One such alternative is exemplified in FIG. 1A which shows one portion of a cell which is similar in all respects to that exemplified in FIG. 1 except for the catalytic layer which is indicated generally at 121. In this alternative form the fine particulate catalyst is distributed and secured to fine mesh screen 141 by means of electroplating or other suitable adhering techniques. One example of such an embodiment that we have found satisfactory is to form screen 141 from 60 x 60 mesh nickel screen with black platinum deposited onto it by electroplating in an amount of 5 milligrams per sq. inch. The screen with black platinum deposit may be impressed onto surface 19 of the anode. In addition an extra protective screen 142 with a fairly open mesh structure may be placed adjacent the catalytic layer for protection thereof. Spring 22 is then pressed against protective screen 142 but otherwise is disposed in identical fashion as described hereinabove in respect to FIG. 1. Although we have described this alternative utilizing electroplating of the black platinum catalyst onto screen 141, other suitable means of adhering the particulate catalyst material may be employed such as by pasting or other techniques known in the art.

Attention is next directed to FIG. 2 which shows our invention embodied in another type of cell configuration in which anode 216, cathode 237 and the separator layer indicated generally at 224 are shaped in the form of a spiral configuration housed within circular container 213. In this type of arrangement the anode and cathode terminals may be insulated from housing 213 and electrically connected to their corresponding electrodes in a manner well-known in the art but not shown on the drawing nor described herein. In this embodiment a catalyst layer similar to that shown in FIG. 1 may be applied along the outer spiral of anode 216 facing passageway 223 formed between the spiral electrode-electrolyte arrangement and inner surface 210 of housing 213. However, in the embodiment shown in FIG. 2 another alternate arrangement of catalytic layer is illustrated which could also be applied to the button or can type cell exemplified in FIGS. 1 and 1A. More specifically the catalytic layer illustrated herein comprises wire mesh screen section 219 which is formed to a convenient arc length having the same configuration and width as that portion of electrode 216 with which it is in contact. Screen 219 has deposited upon it by means of electroplating, pasting or other suitable adhering means, fine catalyst particles of a type as hereinabove described in respect to FIGS. 1 and 1A. The catalytic screen support is held in place by means of V-shaped support members 222 which may be fabricated from stainless steel, rubber, or other suitable material, and may take the form of beads, fibers, rods, screens or other suitable conifigurations. Supports 222 are either provided with holes therethrough or are of differing widths and in a staggered relationship so as to permit oxygen gas in passage 223 to pass therebetween and come into contact with catalytic layer 219.

It is understood of course that in the alternate embodiment shown in FIG. 2 catalytic layers similar in all respects to those shown and described in respect to FIGS. 1 and 1A may be used in lieu of that described including techniques for manufacturing such a cell.

FIG. 3 shows our invention applied to a prismatic type of rechargeable alkaline cell battery comprising cell container 313 which may be fabricated on a nonconductive material such as hard rubber or the like although it is possible to employ the body as one of the electrode terminals by expedients known to those skilled in the battery art. Suspended within body 313 and held in place by means not shown in the figure are outer anodes 316a, inner anode 316, and cathodes 337. As in the aforementioned example, the anodes and cathodes illustrated here may also be made up of oxides and metal powders of the type described hereinabove in respect to FIGS. 1, 1A, and 2. However, in the embodiment of FIG. 3, catalytic layers 321, which in all other respects may be similar to those hereinabove described, should be deposited only on the outer surfaces of outer anodes 316a away from the cathodes and main path of electrical current within the cell. Separator layers indicated at 324 are interspersed between between each of the facing anode-cathode surfaces and have a prismatic shape but otherwise are similar to the separator layers described in greater detail above in respect to FIG. 1. By positioning the various electrodes and electrolyte bearing sections as shown in FIG. 3, and by avoiding flooding of the cell with electrolyte liquid, in a manner hereinabove described in respect to FIG. 1, passageways 323 remain available for the conduction of oxygen gas.

As indicated more schematically anodes 316a and 316 are all electrically connected to each other and to electrode terminal 326, and cathodes 337 are similarly connected by separate internal circuitry to each other and electrode terminal 327. When the cell is charged and overcharged, the recombination of $O_2$ to form hydroxyl ion is similar in all respects as that explained above in respect to the other embodiments of our invention.

Although we have described our invention in the foregoing specification utilizing specific embodiments thereof, a number of electrodes and catalysts, and catalyst supporting materials and techniques have been described or indicated. In addition numerous modifications and combinations may be made embodying our invention in a variety of rechargeable alkaline cell batteries of which the foregoing suggests only a few. Thus it is contemplated that numerous versions of our invention may be developed within the concept of our disclosure and scope of appended claims.

What is claimed is:

1. In a rechargeable alkaline electrochemical cell including an enclosure, a cathode mounted within said enclosure, and a wet separator impregnated with an alkaline electrolyte solution having one surface in liquid contact with said cathode, the combination comprising: a porous anode mounted within said enclosure having one surface thereon in liquid contact with said separator on the surface of the separator out of contact with said cathode; an oxygen recombination catalytic material disposed on the surface of said anode out of contact with said separator; means abutting said anode and said enclosure to hold said anode in special relation to said enclosure thereby defining a passageway between the surface of said anode having said catalytic material disposed thereon and said enclosure whereby oxygen gas produced during the charge and overcharge periods of the charge-discharge cycle of said cell flows into contact with the catalyst increasing the rate at which oxygen gas is reduced to hydroxyl ions at said catalytic material.

2. In a rechargeable alkaline electrochemical cell having an enclosed housing, a cathode electrode mounted within said housing, and a wet separator impregnated with an alkaline electrolyte solution having one surface in liquid contact with said cathode, the combination comprising: a porous anode mounted within said housing having one surface thereof in liquid contact with said separator on the surface of the separator out of contact with said cathode; an oxygen recombination catalytic material comprising minute particles of at least one of the elements selected from the group consisting of the platinum metals, silver, and nickel adhered to the surfaces of relatively larger carrier particles of at least one of the elements selected from the group consisting of silver, nickel, carbon, and graphite, said minute particles and carrier particles disposed on the surface of said anode electrode out of contact with said separator; means to define a space contiguous with the surface of said anode having said catalytic material disposed thereon; and means establishing fluid communication between said space and said anode.

3. The rechargeable alkaline cell in accordance with claim 2 and wherein the density of said minute particles of catalyst in respect to the surface of the anode having said catalytic material disposed thereon is in the range of 0.5 to 100 milligrams per square inch.

4. The rechargeable alkaline electrochemical cell in accordance with claim 2 and wherein the active ingredient of said anode is an element selected from the group consisting of cadmium, zinc, strontium, barium, and indium; and the active ingredient of said cathode is a compound selected from the group consisting of nickel oxide and silver oxide.

5. In a rechargeable alkaline electrochemical cell including an enclosure, a porous anode and a cathode mounted within said enclosure, and a wet separator impregnated with an alkaline electrolyte solution interposed between and in liquid contact with said anode and cathode, the combination comprising: a thin layer of oxygen recombination catalytic material having one surface coextensive with at least a portion of the surface of said anode; means to adhere said one surface of the thin layer of catalytic material to a portion of the anode surface out of contact with said separator; and means to define a passageway between the inside surface of said enclosure and the surfaces of said anode out of contact with said separator, whereby oxygen gas produced during the charge and overcharge periods of the charge-discharge cycle of said cell flows into said passageway and increases the rate at which oxygen gas is reduced to hydroxyl ions at said thin layer of catalytic material.

6. In a rechargeable alkaline chemical cell including an enclosure, an anode and a cathode mounted within said enclosure, and a separator impregnated with an alkaline electrolyte solution interposed between and in liquid contact with said anode and cathode, the combination comprising: an oxygen recombination catalytic material disposed on the surface of said anode out of contact with said separator; means to define a space contiguous with said anode surface having said catalytic material disposed thereon; means establishing fluid communication between said space and said anode; and oxygen gas substantially filling said space and in communication with said anode, whereby oxygen gas produced during the latter stages of the charge and during the overcharge periods of the charge-discharge cycle of said cell communicates with the oxygen gas in said space to increase the pressure of oxygen in the space and the rate of reduction of oxygen gas to hydroxyl ions at said oxygen recombination catalytic material.

7. In a rechargeable alkaline electrochemical cell including an anode and a cathode, a separator impregnated with an alkaline electrolyte solution and interposed between and in liquid contact with said anode and cathode, and an enclosed housing surrounding said anode, cathode and separator, the improvement of an oxygen recombination mechanism comprising, in combination: means mounted in contact with at least a portion of the surface of said anode facing away from said cathode to form an electron conductive grid; a thin deposit of oxygen recombination catalyst material adhered to said means; and a passageway formed between the inside surface of said housing and the surfaces of said anode away from liquid contact with said separator, whereby oxygen gas produced at said cathode during the charge and overcharge portions of the charge-discharge cycle of the cell diffuses into said passageway and increases the rate of reduction of oxygen to hydroxyl ions at said thin deposit of oxygen recombination catalyst material.

8. The rechargeable alkaline electrochemical cell in accordance with claim 7 and wherein said means comprises a metallic grid.

9. The rechargeable alkaline electrochemical cell in accordance with claim 6 and also including a plurality of spacers disposed between and in contact with the inner surface of said housing and the surface of said means facing away from said anode.

10. A rechargeable alkaline electrochemical cell comprising: a housing; a wet separator impregnated with an alkaline electrolyte solution; means to secure said separator within said housing and form a first chamber and a second chamber within the housing on opposite sides of the separator; a porous anode within said first chamber and shaped to fit within a space at least slightly smaller than the first chamber; means to support said anode within said first chamber and urge one surface of the anode into liquid contact with said separator and to define a passageway surrounding the surface of the anode out of contact with the separator; a thin layer of oxygen recombination catalyst material; means to adhere said layer to at least one surface of said anode away from said separator; and a cathode within said second chamber in liquid contact with said separator.

11. The rechargeable alkaline cell in accordance with claim 10 and wherein further said anode is an evenly distributed mixture of a material selected from the group consisting of cadmium, zinc, strontium, barium, and indium with finely divided, relatively inert material of higher conductivity than the oxide of said material uniformly distributed through the material in an amount to cause the mixture to be relatively highly electron conductive when the material is oxidized, and means interspersed with said material and finely divided inert material to bind the mixture together to form a coherent porous mass; and a plurality of electron conductive grids located within and at the surface of said mixture when formed into a coherent porous mass.

12. A rechargeable alkaline cell comprising: a receptacle fabricated from an electron conductive material and having an opening at one end thereof, the periphery of said opening having an outwardly extending radial flange secured thereto; a wet separator impregnated with an alkaline electrolyte solution overlying said opening and in contact with said radial flange; an annular seal fabricated from an electrically nonconductive material having a base portion in overlying contact with the entire peripheral surface of said separator parallel to and out of contact with said flange, and a lip portion of said annular seal integral with the outer periphery of said base portion normal to and extending outwardly from said separator; a dish-shaped receptacle cover fabricated from an electron conductive material shaped to overlie said annular seal and said separator with the hollow portion of said cover facing the separator and the periphery of the cover located on the body portion of the annular seal immediately radially inwardly of said lip portion; means extending from the outer periphery of said radial flange to overlap the outer peripheral edge of said cover and hold the cover in position overlying said separator with the lip portion of said seal disposed between said means and said cover to form a gas tight and electrically insulated connection between the cover and said receptacle; an anode within said receptacle shaped to fit within a space at least slightly smaller than the space defined by the receptacle with said separator overlying said opening; means in contact with said receptacle and said anode to urge the anode into contact with said separator and to define a space between the anode and the inner surface of the receptacle, said space surrounding the surfaces of the anode out of contact with the separator and said means being electron conductive; a thin layer of oxygen recombination catalyst material adhered to said anode at a surface away from said separator; and a cathode in electronically conductive contact with said cover and said separator.

13. A rechargeable alkaline cell comprising: a receptacle fabricated from an electron conductive material and having an opening formed at one end thereof, the periphery of said opening having an outwardly extending radial flange secured thereto; a separator impregnated with an alkaline electrolyte solution overlying said opening and spaced slightly away from said radial flange; an annular seal fabricated from an electrically non-conductive material having a base portion overlying the entire peripheral surface of said separator parallel to and out of contact with said flange, and a lip portion integral with the outer periphery of said base portion normal to and extending outwardly from said separator; a dish-shaped receptacle cover fabricated from an electron conductive material shaped to overlie said annular seal and said separator with the hollow portion of said cover facing the separator and the periphery of the cover located on the body portion of the annular seal immediately radially inwardly of said lip portion; an annular barrier fabricated from a material selected from the group consisting of polymers and elastomers, each being of the flexible, solid, impermeable type, said barrier forming a continuous band between and in contact with said radial flange and the portion of said separator spaced slightly away from said flange; means extending from the outer periphery of said radial flange to overlap the outer peripheral edge of said cover and hold the cover in position overlying said separator and annular seal with the lip portion of said seal disposed between said means and the periphery of said cover to form a gastight and electrically insulated connection between the cover and said receptacle; a porous anode within said receptacle shaped to fit within a space at least slightly smaller than the space defined by the receptacle with said separator overlying said opening; means in contact with said receptacle and said anode to urge the anode into contact with said separator to define a space between the anode and the inner surface of the receptacle, said space surrounding the surfaces of the anode out of contact with the separator, and said means being electron conductive; a thin layer of oxygen recombination catalyst material adhered to said anode at a surface away from said separator; and a cathode in electronically conductive contact with said cover and said separator.

14. A rechargeable alkaline cell comprising in combination: an enclosed housing; a spiral-shaped porous anode located within said housing having one end near the center of the housing and the other end near the inner peripheral surface of the housing; a spiral-shaped cathode interleaved with said porous anode; a spiral-shaped separator impregnated with an electrolyte solution interleaved between and in wetting contact with said anode and cathode; an oxygen recombination catalyst material disposed on a portion of said anode out of contact with said separator and near the peripheral inner surface of said housing; and means in contact with said inner peripheral surface of the housing and a portion of said anode adjacent thereto to urge said anode away from the inner surface to form a passageway in fluid communication with said anode and said oxygen recombination catalyst material disposed on the anode.

15. In a rechargeable alkaline electrochemical cell, the combination comprising: a plurality of cathode and porous anode electrodes arranged with successive electrodes being of opposite polarity; a wet separator interposed between and in liquid contact with at least two successive electrodes with one of said electrodes being an anode having a surface facing away from the other said electrode and out of contact with said wet separator; an oxygen recombination catalytic material disposed on the surface of said anode facing away from said electrode and out of contact with said wet separator; means to define a space abutting the surface of said anode having said catalytic material disposed thereon; and means establishing fluid communication between said space and said anode, whereby oxygen gas produced during the charge and overcharge periods of the charge-discharge cycle of said cell flows into said passageway and increases the rate at which oxygen gas is reduced to hydroxyl ions at said catalytic material.

References Cited

UNITED STATES PATENTS

| | | | |
|---|---|---|---|
| 3,356,533 | 12/1967 | Carson | 136—24 |
| 2,737,541 | 3/1956 | Coolidge | 136—24 |
| 2,934,580 | 4/1960 | Neumann | 136—24 |
| 3,081,367 | 3/1963 | Field et al. | 136—24 |
| 3,311,505 | 3/1967 | Paget et al. | 136—24 |

FOREIGN PATENTS 792,464  3/1958  Great Britain.

WINSTON A. DOUGLAS, *Primary Examiner.*

C. F. LE FEVOUR, *Assistant Examiner.*

U.S. Cl. X.R.

136—179, 24, 20